(12) United States Patent
Gordner et al.

(10) Patent No.: US 10,606,564 B2
(45) Date of Patent: Mar. 31, 2020

(54) COMPANION WINDOW EXPERIENCE

(75) Inventors: Jonathan Gordner, Redmond, WA (US); Stephan Hoefnagels, New York, NY (US); Josh Clow, Bellevue, WA (US); Colin Jeanne, Woodinville, WA (US); Alexander Allen, Seattle, WA (US); Kenneth Parker, Bellevue, WA (US); Nandini Bhattacharya, Bellevue, WA (US); Jonathan Li, Bellevue, WA (US); Kieran Snyder, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 885 days.

(21) Appl. No.: 12/978,659

(22) Filed: Dec. 27, 2010

(65) Prior Publication Data
US 2012/0167004 A1  Jun. 28, 2012

(51) Int. Cl.
*G06F 8/33* (2018.01)
*G06F 3/0481* (2013.01)
*G06F 3/048* (2013.01)

(52) U.S. Cl.
CPC .............. *G06F 8/33* (2013.01); *G06F 3/048* (2013.01); *G06F 3/0481* (2013.01)

(58) Field of Classification Search
CPC ........... G06F 3/048; G06F 3/0481; G06F 8/33
USPC .......................................... 715/792, 781, 790
See application file for complete search history.

(56) References Cited

U.S. PATENT DOCUMENTS

| | | | | |
|---|---|---|---|---|
| 5,361,361 A | * | 11/1994 | Hickman et al. | 715/705 |
| 5,469,540 A | | 11/1995 | Powers et al. | |
| 5,634,095 A | * | 5/1997 | Wang et al. | 715/763 |
| 5,734,837 A | * | 3/1998 | Flores | G06Q 10/06311 |
| | | | | 705/7.13 |
| 6,971,067 B1 | | 11/2005 | Karson et al. | |
| 7,342,594 B1 | * | 3/2008 | Ort et al. | 345/629 |
| 7,343,566 B1 | * | 3/2008 | Chaudhri et al. | 715/781 |

(Continued)

FOREIGN PATENT DOCUMENTS

CN   101675425 A   3/2010

OTHER PUBLICATIONS

Waldner, et al., "Visual Links across Applications", Retrieved at << http://www.caleydo.org/publication/2010_GI_VisualLinksAcrossApplications.pdf >>, Graphics Interface, May 31-Jun. 2, 2010.

(Continued)

*Primary Examiner* — Angie Badawi
(74) *Attorney, Agent, or Firm* — Workman Nydegger

(57) ABSTRACT

Architecture that generates a companion window in combination with a source application experience to enable the accomplishment of a side task yet not switch away from the context of the source application. The companion window experience is a window that is rendered proximate (e.g., beside) a user's source application experience, in a predictable location, and with a predictable user model for invocation and dismissal. The companion window allows the user to retain full visual context of the associated source application experience, while rendering activities that directly pertain to the source application experience or activities that allow the user to interact with two applications.

13 Claims, 7 Drawing Sheets

(56) References Cited

U.S. PATENT DOCUMENTS

| | | | |
|---|---|---|---|
| 7,411,510 B1* | 8/2008 | Nixon | G06F 19/3418 340/573.1 |
| 7,461,352 B2 | 12/2008 | Katsuranis | |
| 8,286,199 B1* | 10/2012 | Pulaski et al. | 719/329 |
| 8,341,541 B2* | 12/2012 | Holecek et al. | 715/782 |
| 8,488,242 B2* | 7/2013 | Hill et al. | 359/566 |
| 8,601,371 B2* | 12/2013 | Dirks et al. | 715/710 |
| 2003/0043197 A1* | 3/2003 | Kremer et al. | 345/781 |
| 2003/0219707 A1* | 11/2003 | Hopkins et al. | 434/350 |
| 2004/0030719 A1* | 2/2004 | Wei | 707/104.1 |
| 2004/0268262 A1* | 12/2004 | Gupta et al. | 715/718 |
| 2005/0125739 A1 | 6/2005 | Thompson et al. | |
| 2005/0138559 A1* | 6/2005 | Santos-Gomez et al. | 715/709 |
| 2006/0059525 A1* | 3/2006 | Jerding et al. | 725/87 |
| 2006/0150094 A1 | 7/2006 | Patrawala | |
| 2006/0265647 A1* | 11/2006 | Nicholas et al. | 715/530 |
| 2007/0128899 A1* | 6/2007 | Mayer | 439/152 |
| 2007/0157075 A1* | 7/2007 | Ritter | 715/507 |
| 2007/0291362 A1* | 12/2007 | Hill et al. | 359/567 |
| 2007/0300161 A1* | 12/2007 | Bhatia et al. | 715/745 |
| 2007/0300179 A1* | 12/2007 | Friedlander | 715/781 |
| 2008/0082924 A1* | 4/2008 | Pally | 715/744 |
| 2008/0177994 A1* | 7/2008 | Mayer | 713/2 |
| 2008/0229202 A1* | 9/2008 | Fang et al. | 715/716 |
| 2008/0276195 A1* | 11/2008 | Moromisato et al. | 715/783 |
| 2010/0070899 A1* | 3/2010 | Hunt et al. | 715/769 |
| 2012/0042002 A1* | 2/2012 | Smith et al. | 709/203 |
| 2013/0042201 A1* | 2/2013 | Sandman et al. | 715/781 |
| 2013/0151964 A1* | 6/2013 | Massaro et al. | 715/711 |
| 2014/0104643 A1* | 4/2014 | Park | 358/1.15 |

OTHER PUBLICATIONS

"International Search Report", dated Aug. 29, 2012, Application No. PCT/US2011/067388, Filed Date: Dec. 27, 2011, pp. 10.

Jhaveri, et al., "The Advantages of a Cross-Session Web Workspace", CHI extended abstracts on Human factors in computing, systems, 2005, pp. 1949-1952.

"First Office Action and Search Report Received in Chinese Patent Application No. 201110443835.0", dated Mar. 25, 2014, Filed Date: Dec. 27, 2011, 14 Pages.

"Office Action Issued in Chinese Patent Application No. 201110443835. 0", dated Dec. 1, 2014, 11 Pages.

"Second Office Action Issued in Chinese Patent Application No. 201110443835.0", dated Aug. 26, 2014, 8 Pages.

"Response Filed for the Second Office Action Issued in Chinese Patent Application No. 201110443835.0", Filed Date: Nov. 7, 2014, 9 Pages.

"Response Filed for the Third Office Action Issued in Chinese Patent Application No. 201110443835.0", Filed Date: Feb. 13, 2015, 7 Pages.

"Office Action Received in Taiwan Patent Application No. 100143409", dated Oct. 29, 2015, 8 Pages. (W/o English Translation).

"Office Action and Search Report Issued in Taiwan Patent Application No. 100143409", dated Jul. 21, 2015, 10 Pages.

* cited by examiner

COMPANION WINDOW EXPERIENCE

BACKGROUND

Users increasingly use computers for viewing media, reading articles, and playing games, activities where it is desirable for the user to have an immersive full-screen experience. Applications and websites designed for these activities typically envelope the full screen, or as much of the screen as the underlying platform offers. If a user wants to carry out a related activity in support of a source application experience, there is currently no easy way for the user to carry out those related companion activities in a way that allows the user to maintain the visual relationship of a companion activity.

For example, if the user wants to post a link to a newspaper article to the user's social network site or if the user wants to project a movie being watching on a laptop to the user's television for an immersive full-screen experience from which the user began, there is currently no way for the user to carry out those related companion activities in a way that allows the user to maintain the visual relationship in a way that offers a way to get back to the immersive full-screen experience once finished with the companion activity, and is consistent across all applications and across a broad set of desired companion activities, including activities that involve an application that is different from the source application in a user's source window.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides the capability to generate a companion window in combination with a source application experience to enable the accomplishment of a side task by a target application via the companion, yet not switch away from the context of the source application. This provides a standard predictable way for the user to complete companion activities across all of the applications used.

The companion window experience is a window that is rendered proximate (e.g., beside) a user's source application experience, in a predictable location, and with a predictable user model for invocation and dismissal. The companion window allows the user to retain full visual context of the associated source application experience, while rendering activities in the companion window using a target application that directly pertain to the source application experience or activities that allow the user to interact with two applications within the same visual context.

The companion window experience is predictable across the user's entire application experience, including extensibility points so that any application (the companion window architecture is application agnostic) on the system can take advantage of the companion window architecture to host associated companion activities.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
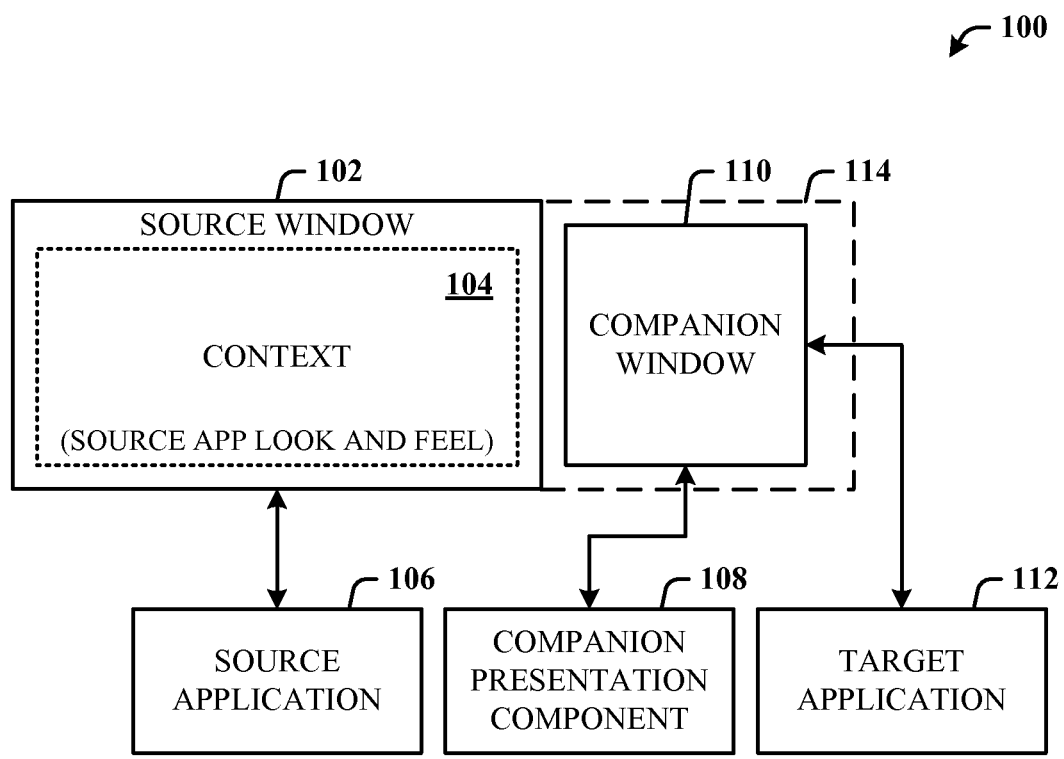
FIG. 1 illustrates a computer-implemented system in accordance with the disclosed architecture.

The disclosed architecture generates and manages a companion window with a source application experience of a source application window. The companion window is a window that is rendered proximate (e.g., beside, over, temporary fly over panel, etc.) the source application experience, in a predictable location and with a predictable user model for invocation and dismissal.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented system 100 in accordance with the disclosed architecture. The system 100 includes a source window 102 that presents context 104 of a source application 106, and a companion presentation component 108 that generates and presents a companion window 110 in association with the source window 102. The companion window 110 employs a user interface that interacts with a target application 112 and renders the context 104 related to activities being performed in the source application 106. The generation of the companion window 110 is agnostic as to type of source application 106. In other words, the companion window 110 can be generated for any type of source application 106 or target application 112.

The source application experience of the source window 102 can be retained when in presentation with the companion window 110. The companion presentation component 108 automatically generates the companion window 110 for interaction with the target application 112 in response to interaction with content in the context 104 of the source window 102. For example, as is configurable, if the user interacts with an embedded link in a document of a word processor (the source application 106), the companion presentation component 108 automatically opens and presents the companion window 110 using the graphical user interface (experience) of a browser application (the target application 112). In other words, the companion window experience utilizes the GUI normally associated with the target application 112 or retains predominantly the look and feel of the source application 106.

The companion presentation component 108 presents the companion window 110 proximate (e.g., beside) the source window 102. The source window 102 can remain unoccluded by the companion window 110 and the context 104 of the source window 104 reflows (objects and entities are moved in the source window 102 to accommodate the companion window 110) to retain a full-screen presentation of the source window 102. In other words, if the source window 102 initially also comprises the dashed portion 114 as the full-screen real estate, introduction of the companion window 110 causes reflow of the source window experience (the context 104 and the look and feel) to accommodate both the windows (102 and 110). When the companion window terminates, reflow can be back to substantially the original structure of the source window 102.

The companion window 110 is bound (in software) to the source application 106 and displayed only with the source application 106. The companion window 110 conforms to look and feel of a graphical user interface of the source application 106 in the source window 102. In other words, the companion window 110 can be modal (a user can interact with the companion window 110, but dismissed the window 110 before interacting with the source window 102) to the source application 106. It is also contemplated that the companion window 110 can be modeless (a user can interact with both the companion window 110 and the source window 102, without dismissing the companion window 110 before interacting with the source window 102) to the source application 106. The companion presentation component 108 animates the companion window 110 on creation, exit, and page transition of the companion window 110. The companion presentation component 108 generates and presents the companion window 110 in response to a call from the source application 106.

Generally, the user is allowed to retain full visual context of the source application experience. The companion window 110 can be used to render activities that directly pertain to the source application experience or activities that allow the user to connect two applications together (the source application 106 and target application 112).

Alternatively, the companion window 110 can partially or entirely obscure the source window while retaining the look and feel of a graphical user interface of the source application 106. Again, however, the companion window 110 can partially or entirely obscure the source window without retaining the look and feel of a graphical user interface of the source application 106.

The companion window experience is predictable across a user's entire application experience, including extensibility points so that any application on the user system can take advantage of the companion window experience to host the desired companion activities. This is in contrast to existing platform approaches that typically rely on individual applications or websites to UI designs for companion experiences, with the result that the user experience for these activities is inconsistent across the platform.

The disclosed companion architecture provides a companion window experience with which users are familiar. Moreover, the experience is consistent and a lightweight way of completing tasks that are related to the content of the current application. The user learning curve is short since users can become familiar and comfortable with the set of common actions connecting experiences to the tailored set of applications and devices used, rather than being forced to adjust to multiple "walled gardens" with generic conventions and paradigms, as can be found on the Internet and across many mobile and desktop platforms. In accordance with the disclosed architecture, developers can focus on the core competency of an application, and will no longer need to create special UI for companion experiences, and will be able to develop commands in a way that is consistent and familiar for users.

Generally, the experience in the companion window 110 applies to what the user was focusing on when launched. When the companion window 110 is started, the companion window is in the context of the user's current selection (implicit or explicit). The companion window 110 does not occlude any part of the user's source application UI. The companion window 110 displays alongside, for example, the source application 106 and cause the source application 106 to reflow, as necessary.

The companion window 110 is bound to the source application that calls it. If a user switches to another application (source application), the companion window for the previous source application does not show, but is available when the user switches back to the original context of the original source application.

The companion window UI can take on the look and feel of target application(s) that are hosted inside the companion window. When the companion window 110 is presenting specific target application functionality, the companion window 110 can be made to look and feel like the target application.

The companion window 110 can be configured to animate on entrance, exit, and page transition. All transitions to and from the companion window 110 can be configured to animate in a distinctive way that makes sense to the user and reinforces the "mechanics" of the companion window 110. A system companion window can be used by applications for their own companion activities, and the companion window UI can be created by and called from source applications.

Put another way, a computer-implemented system is disclosed that comprises a source window that presents a source application GUI of a source application. The context of the source window is displayed as a full-screen presentation. The companion presentation component automatically generates a companion window in association with the source window. The companion window employs a GUI that facilitates interaction with a target application and renders an activity related to the context of the source application for processing by the target application. The context of the source window reflows to retain the full-screen presentation.

The companion window is created by and called from the source application, the companion window bound to the source application, and the companion window is displayed only with the source application. The companion window is automatically generated for interaction with the target application in response to interaction with content in the context of the source window. The companion window animates on at least one of entrance, exit, or page transition. The companion window is temporary and terminates upon completion of a task related to the context. In an alternative implementation, or in combination with the above scenario, the companion window 110 can be generated by the system user interface as well.

Figure 2:
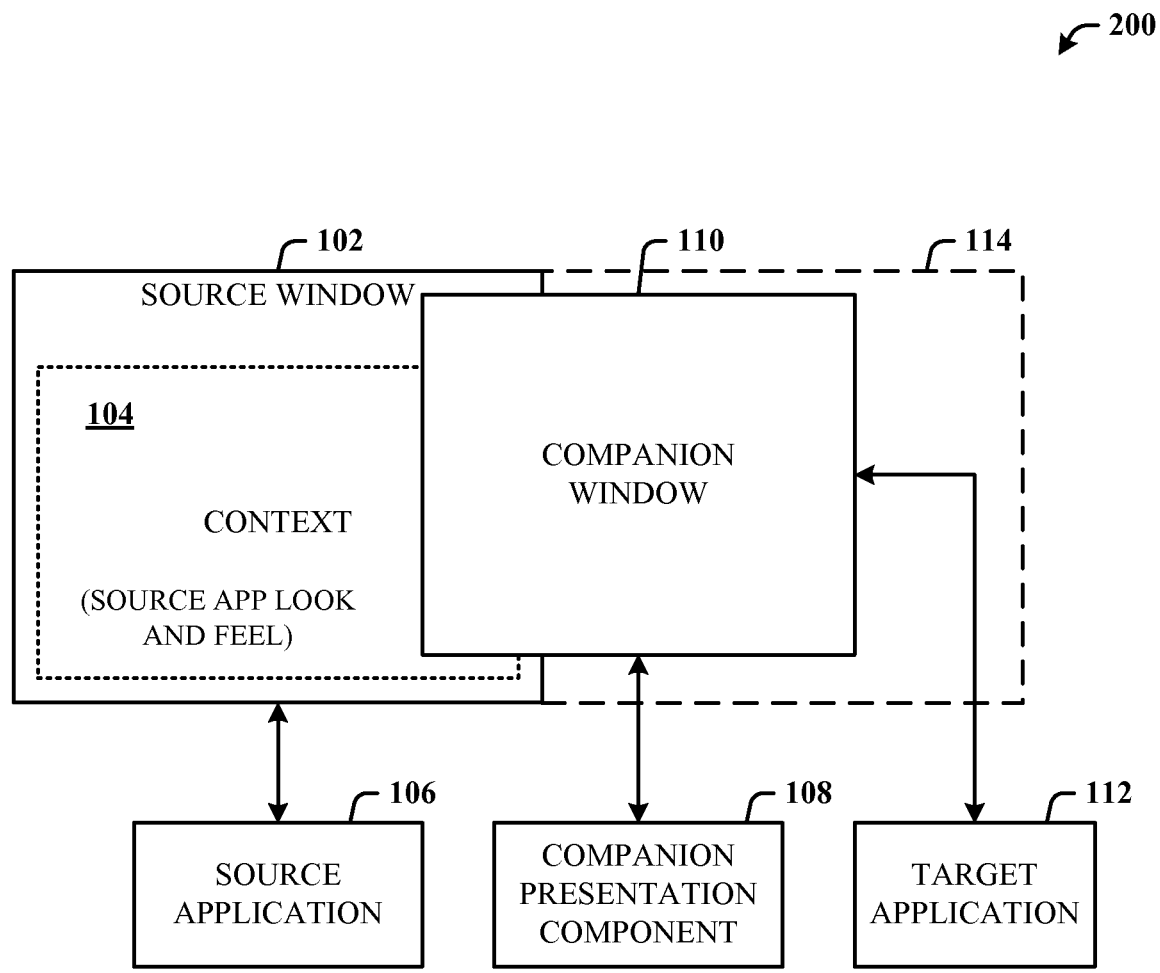
FIG. 2 illustrates an alternative embodiment of a system where the companion window can overlap the source window.

FIG. 2 illustrates an alternative embodiment of a system 200 where the companion window 110 can overlap the source window 102. Thus, the companion window 110 is not coded to be fixed adjacent (in any direction) without any possible overlap of the source window 102. This can be a personal configuration decision by the user, for example. Moreover, as the user navigates between the source window 102 and the companion window 110, the windows (102 and 110) can be shifted to the foreground or the background based on which window (102 and 110) is the active window (foreground).

Figure 3:
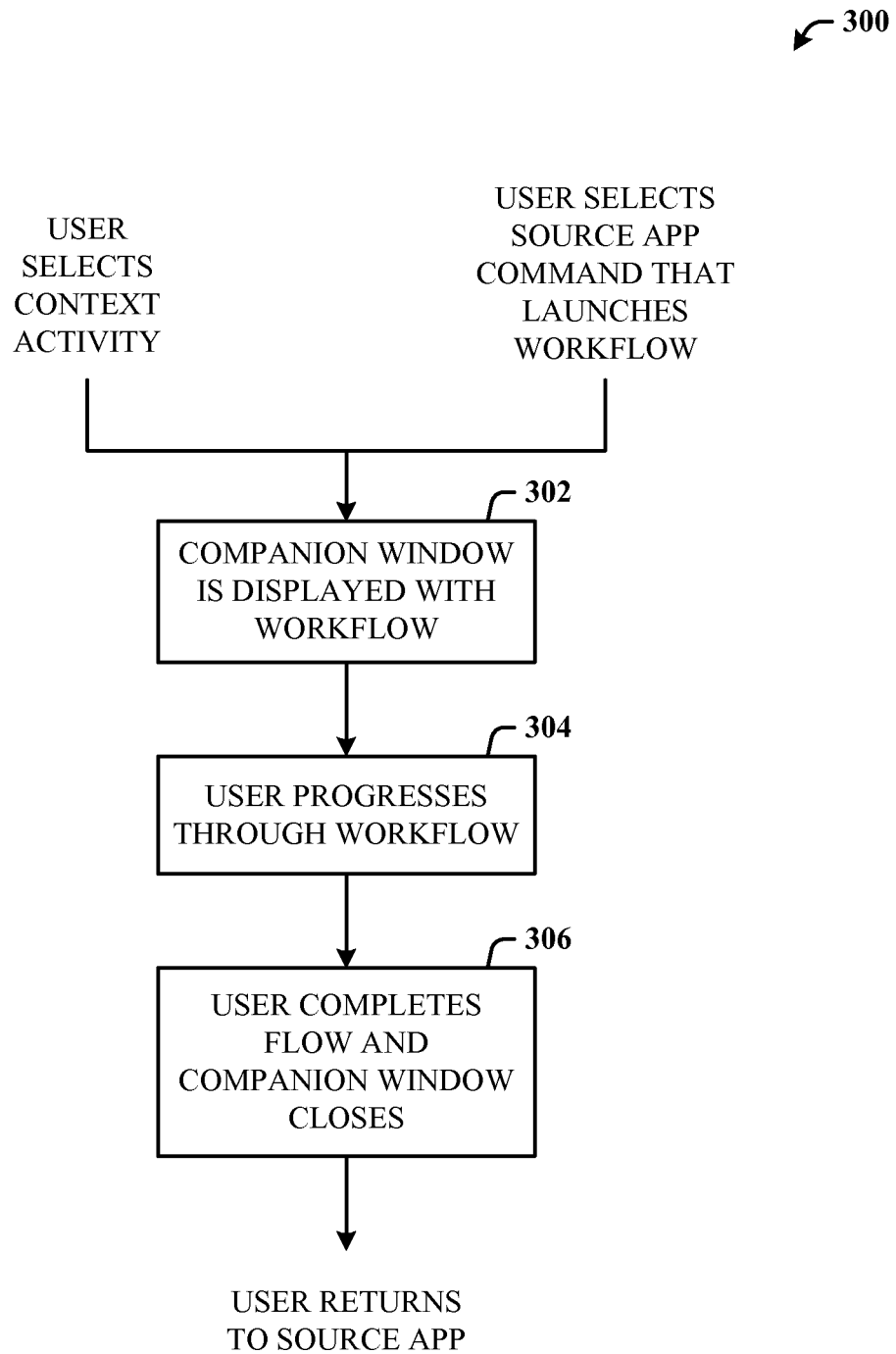
FIG. 3 illustrates an exemplary workflow for a way in which the companion window may be used.

FIG. 3 illustrates an exemplary workflow 300 for a way in which the companion window may be used. Initially, operating from the source application and source application experience and context, the user selects an activity in the context that may require operations form a different application (the target application). Similarly, the user selects a source application command (e.g., clicks on a control object) that launches the workflow. In response, at 302, the companion window is generated and displays the workflow. At 304, the user progresses through the workflow in the companion window. At 306, the user completes the workflow and the companion window closes. The user then returns to the source application.

Figure 4:
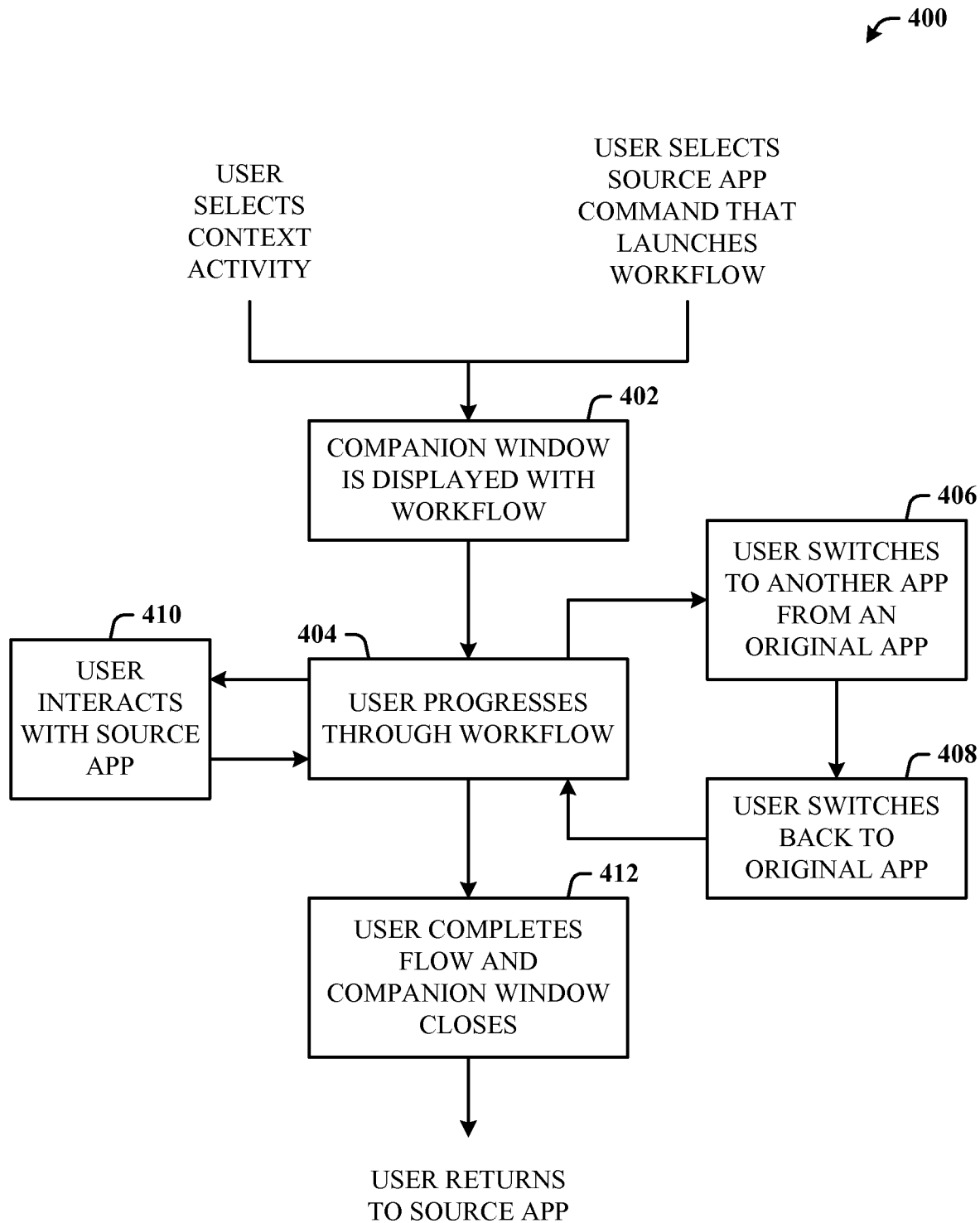
FIG. 4 illustrates an alternative workflow for a way in which the companion window may be used.

FIG. 4 illustrates an alternative workflow 400 for a way in which the companion window may be used. Initially, operating from the source application and source application experience and context, the user selects an activity in the context that may require operations form a different application (the target application). Similarly, the user selects a source application command (e.g., clicks on a control object) that launches the workflow. In response, at 402, the companion window is generated and displays the workflow. At 404, the user progresses through the workflow in the companion window. This can involve the user switching to another application while in the companion window workflow, as indicated from 404 to 406. At 408, the user switches back to the original application. Flow is then from 408 to 404 to continue in the companion window workflow. It can also be the case that progression through the workflow takes the user to interaction with the source application, as indicated at 410. Thereafter, flow is back to the companion window flow, and from 404 to 412, the user completes the workflow and the companion window closes. The user then returns to the source application.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
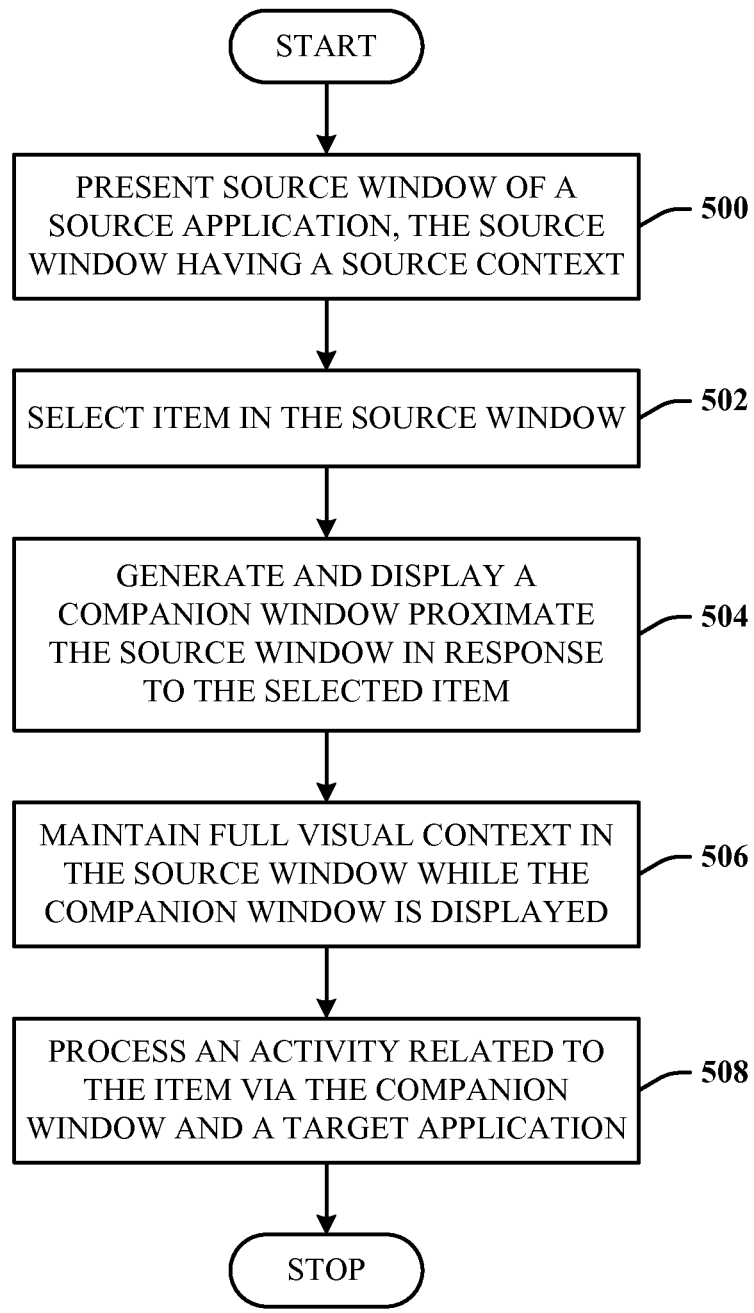
FIG. 5 illustrates a computer-implemented method in accordance with the disclosed architecture.

FIG. 5 illustrates a computer-implemented method in accordance with the disclosed architecture. At 500, a source window of a source application is presented, the source window having a source context. At 502, an item in the source window is selected. At 504, a companion window is generated and displayed proximate the source window in response to the selected item. At 506, full visual context is maintained in the source window while the companion window is displayed. At 508, an activity related to the item is processed via the companion window and a target application.

Figure 6:
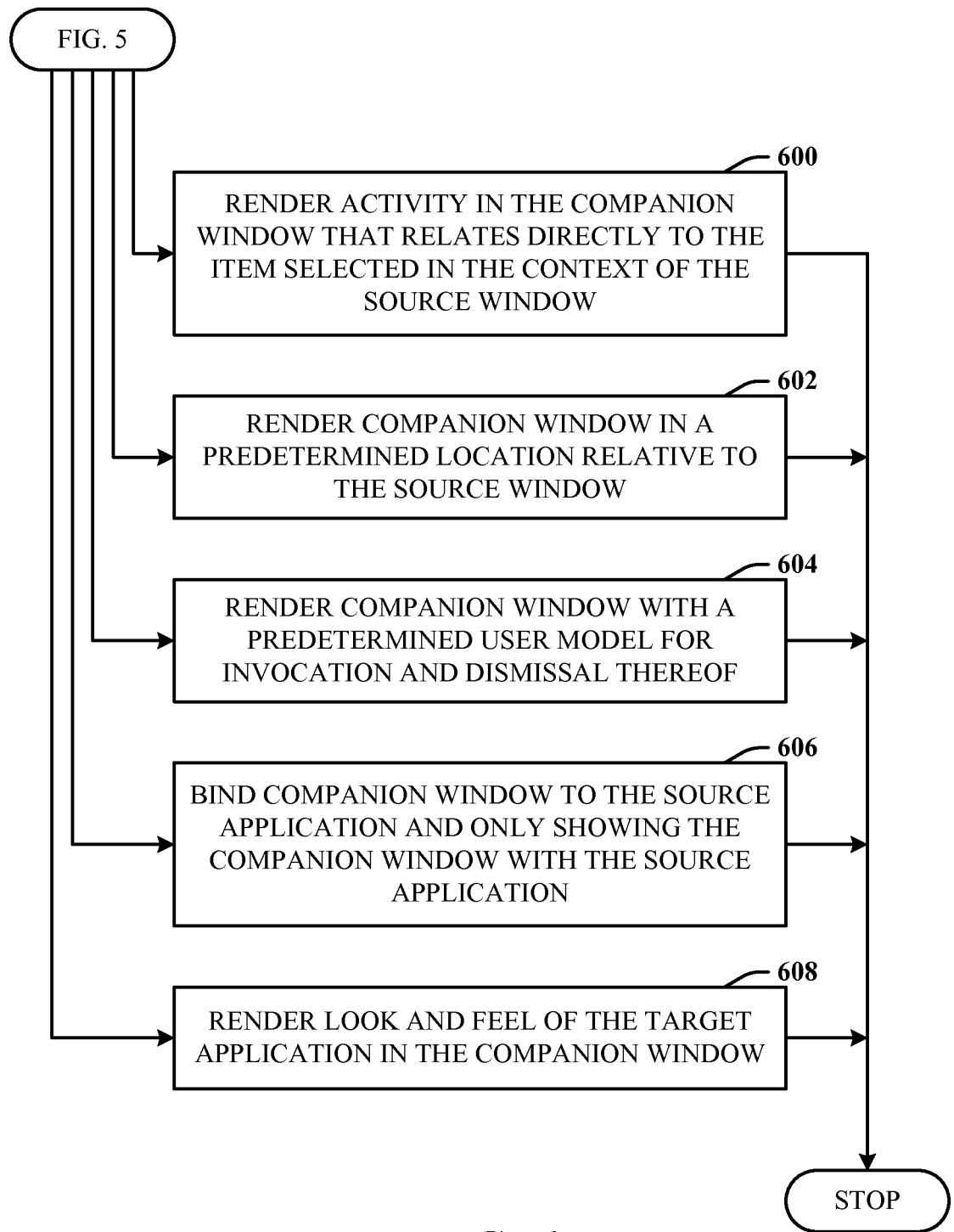
FIG. 6 illustrates further aspects of the method of FIG. 5.

FIG. 6 illustrates further aspects of the method of FIG. 5. Note that the arrowing indicates that each block represents a step that can be included, separately or in combination with other blocks, as additional aspects of the method represented by the flow chart of FIG. 5. At 600, the activity in the companion window that relates directly to the item selected is rendered in the context of the source window. At 602, the companion window is rendered in a predetermined location relative to the source window. At 604, the companion window is rendered with a predetermined user model for invocation and dismissal thereof. At 606, the companion window is bound to the source application and the companion window is only showed with the source application. At 608, look and feel of the target application is rendered in the companion window.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
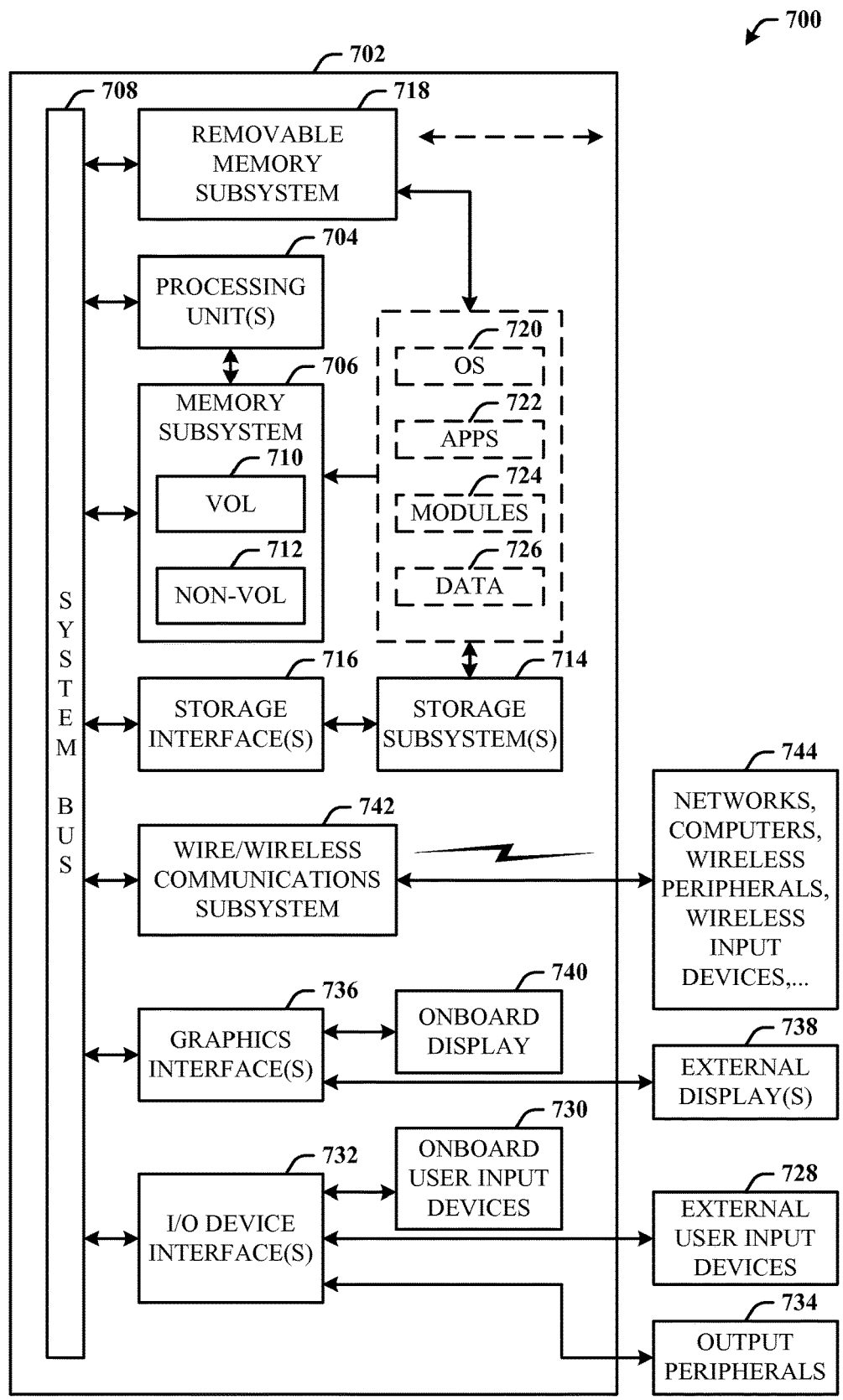
FIG. 7 illustrates a block diagram of a computing system that executes the companion window experience in accordance with the disclosed architecture.

Referring now to FIG. 7, there is illustrated a block diagram of a computing system 700 that executes the companion window experience in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include the entities and components of the system 100 of FIG. 1, the entities and components of the system 200 of FIG. 2, the workflow 300 of FIG. 3, the workflow 400 of FIG. 4, and the methods represented by the flowcharts of FIGS. 5 and 6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system, such that the companion window provides interaction with a distributed application.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system comprising:
   at least one processor; and
   at least one computer-readable media having stored thereon computer-executable instructions that are executable by the at least one processor to cause the computer system to present a companion window of a target application that operates within a context of a source application without occluding a user interface of the source application, the computer-executable instructions including instructions that are executable by the at least one processor to at least:
   present a source window that includes a user interface of a source application that presents a workflow over a set of content, the source window occupying an initial screen real estate;
   based on a selection of a portion of the set of content at the user interface of the source application, present a companion window to operate on the selected portion of the set of content without occluding any portion of the source window, including:
      prior to presenting the companion window, reflowing the user interface of the source application so that the source window occupies a reduced screen real estate, such that the initial screen real estate can fully accommodate a companion window while retaining a visual context of the user interface of the source application within the source window; and
      presenting the companion window beside the source window in order to occupy a visual space created by reflowing the source user interface to occupy the reduced screen real estate, the companion window including a target user interface of a target application that is separate from the source application;
   execute the target application to operate on the portion of the set of content selected in the source window; and
   subsequent to presenting the companion window, and based on termination of the target application, terminate the companion window and reflow the user interface of the source application so that the source window again occupies the initial screen real estate.

2. The system of claim 1, wherein the companion window is bound to the source application and displayed only with the source application.

3. The system of claim 1, wherein the target user interface conforms to look and feel of the user interface of the source application in the source window.

4. The system of claim 1, wherein the system animates the companion window presentation on creation, exit, and page transition of the companion window.

5. The system of claim 1, wherein the system generates and presents the companion window in response to a call from the source application.

6. A computer program product comprising at least one non-volatile physical storage media storing instructions that, when executed by a processor, cause a system to perform at least the following:
   present a source window that includes a user interface of a source application that presents a workflow presented over a set of content, the source window occupying an initial screen real estate;
   based on a selection of a portion of the set of content at the user interface of the source application, present a companion window to operate on the selected portion of the set of content without occluding any portion of the source window, including:
      prior to presenting the companion window, reflowing the user interface of the source application so that the source window occupies a reduced screen real estate, such that the initial screen real estate can fully accommodate a companion window while retaining a visual context of the user interface of the source application within the source window; and
      presenting the companion window beside the source window in order to occupy a visual space created by reflowing the source user interface to occupy the reduced screen real estate, the companion window including a target user interface of a target application that is separate from the source application;
   execute the target application to operate on the portion of the set of content selected in the source window; and
   subsequent to presenting the companion window, and based on termination of the target application, terminate the companion window and reflow the user interface of the source application so that the source window again occupies the initial screen real estate.

7. The computer program product of claim 6, wherein the companion window is bound to the source application, and the companion window is displayed only with the source application.

8. The computer program product of claim 6, wherein the companion window is animated on at least one of entrance, exit, or page transition.

9. A method, implemented at a computer system that includes one or more processors of presenting a companion window of a target application that operates within a context of a source application without occluding a user interface of the source application, the method comprising:

presenting a source window that includes a user interface of a source application that presents a workflow over a set of content, the source window occupying an initial screen real estate;

based on a selection of a portion of the set of content at the user interface of the source application, presenting a companion window to operate on the selected portion of the set of content without occluding any portion of the source window, including:

prior to presenting the companion window, reflowing the user interface of the source application so that the source window occupies a reduced screen real estate, such that the initial screen real estate can fully accommodate a companion window while retaining a visual context of the source application within the source window; and presenting the companion window beside the source window in order to occupy a visual space created by reflowing the source user interface to occupy the reduced screen real estate, the companion window including a target user interface of a target application that is separate from the source application;

executing the target application to operate on the portion of the set of content selected in the source window; and subsequent to presenting the companion window, and based on termination of the target application, terminating the companion window and reflow the user interface of the source application source application so that the source window again occupies the initial screen real estate.

10. The method of claim 9, further comprising rendering activity in the companion window that relates directly to the portion of the set of content selected in the source window.

11. The method of claim 9, further comprising rendering the companion window with a predetermined user model for invocation and dismissal thereof.

12. The method of claim 9, wherein the companion window is bound to the source application and is only shown with the source application.

13. The method of claim 9, wherein the target user interface conforms to a look and feel of the source application.

* * * * *